(12) United States Patent
Miyashita

(10) Patent No.: US 7,043,144 B2
(45) Date of Patent: May 9, 2006

(54) CAMERA

(75) Inventor: Mamoru Miyashita, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 930 days.

(21) Appl. No.: 09/840,240

(22) Filed: Apr. 24, 2001

(65) Prior Publication Data

US 2001/0033741 A1  Oct. 25, 2001

(30) Foreign Application Priority Data

Apr. 24, 2000 (JP) .............................. 2000-122918

(51) Int. Cl.
  *H04N 7/04* (2006.01)
  *H04N 5/76* (2006.01)
(52) U.S. Cl. ...................... 386/107; 386/117; 386/104
(58) Field of Classification Search ................ 386/117, 386/118, 107, 104, 105, 106, 120, 46, 38, 386/39, 1, 99, 98, 102; 348/207.99, 222.1; 358/471, 302
See application file for complete search history.

(56) References Cited

U.S. PATENT DOCUMENTS

| 4,864,425 A | * | 9/1989 | Blazek et al. ............... 386/107 |
| RE36,589 E | * | 2/2000 | Akamine et al. ............. 369/14 |
| 2001/0017979 A1 | * | 8/2001 | Fukuoka et al. ............ 386/117 |

FOREIGN PATENT DOCUMENTS

JP   7154734   6/1995

* cited by examiner

*Primary Examiner*—Robert Chevalier
(74) *Attorney, Agent, or Firm*—Birch, Stewart, Kolasch & Birch, LLP

(57) ABSTRACT

When a digital still camera stores moving image data in an image memory card, audio data obtained by a microphone and audio data of desired music obtained from a music memory card are mixed at a desired mixing ratio, and the mixed audio data is stored in the image memory card with the moving image data. Thereby, audio such as background music can be recorded at the shooting, and the reproduction of the moving image is enjoyable.

29 Claims, 2 Drawing Sheets

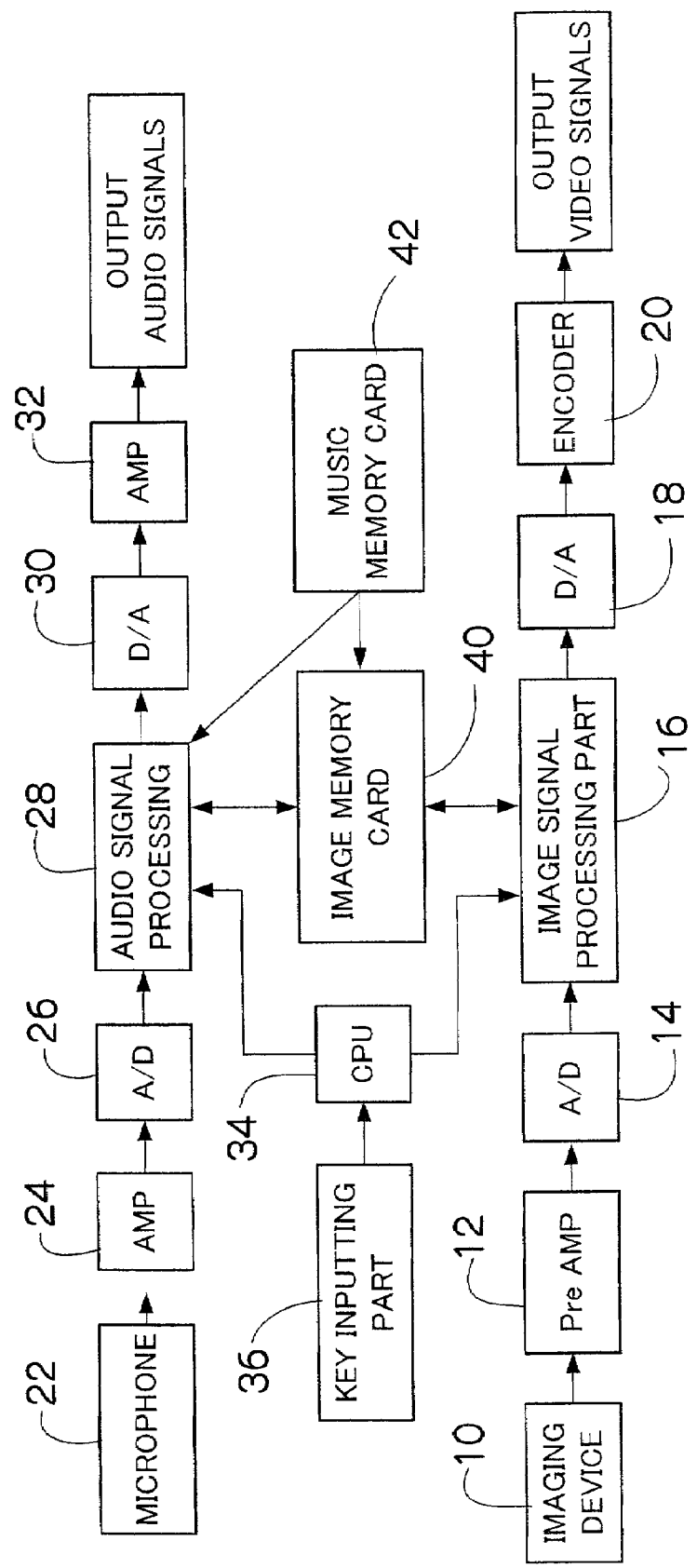
F I G. 1

CAMERA

BACKGROUND OF THE INVENTION

1. Field of the Invention

The present invention relates to a camera, particularly to a camera which can store both image data and audio data in a storage medium.

2. Description of the Related Art

Japanese Patent Application Laid-open No. 7-154734 discloses a digital still camera, which can record not only a still image but also a moving image in a memory card, and can record audio captured by a microphone at the same time.

However, in case little audio was recorded (for example, a landscape was shot) or audio was not recorded, the reproduction of the image is dull.

SUMMARY OF THE INVENTION

The present invention has been developed in view of the above-described circumstances, and has as its object the provision of a camera in which reproduction of a recorded image is enjoyable.

In order to achieve the above-described objects, the present invention is directed to a camera comprising: an image data storing device that stores image data captured by an imaging device in a first storage medium; an audio data obtaining device that obtains audio data from one of the first storage medium and a second storage medium; and an audio data storing device that records in the first storage medium the audio data obtained by the audio data obtaining device when the image data storing device stores the image data in the first storage medium.

The present invention is also directed to a camera comprising: an image data storing device that stores image data captured by an imaging device in a first storage medium; an audio data obtaining device that obtains audio data from one of the first storage medium and a second storage medium; and an audio data storing device that selectively records in the first storage medium one of the audio data obtained by the audio data obtaining device and audio data captured by a microphone when the image data storing device stores the image data in the first storage medium.

The present invention is also directed to a camera comprising: an image data storing device that stores image data captured by an imaging device in a first storage medium; an audio data obtaining device that obtains audio data from one of the first storage medium and a second storage medium; and an audio data storing device that mixes the audio data obtained by the audio data obtaining device and audio data captured by a microphone when the image data storing device stores the image data in the first storage medium, and records the mixed audio data in the first storage medium.

The image data captured by the imaging device is desirably moving image data.

The camera may further comprise two mounting parts to which the first storage medium and the second storage medium are attached.

The second storage medium may be built in the camera.

The second storage medium may be a rewritable storage medium.

The camera may further comprise an audio reproducing device that reproduces audio recorded in one of the first storage medium and the second storage medium.

According to the present invention, the audio data of music or the like is obtained from the storage medium and stored with the image data. Therefore, the present invention is effective in a case where little audio is recorded (for example, a landscape is shot) or audio is not recorded, and thus the reproduction of the image can be enjoyable due to the audio from the storage medium. Moreover, since audio such as background music can be mixed with the audio from the microphone at the shooting, time-consuming audio editing after the shooting can be eliminated.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a block diagram showing a structure of a digital still camera to which the present invention is applied.

DETAILED DESCRIPTION OF THE PREFERRED EMBODIMENTS

Figure 2:
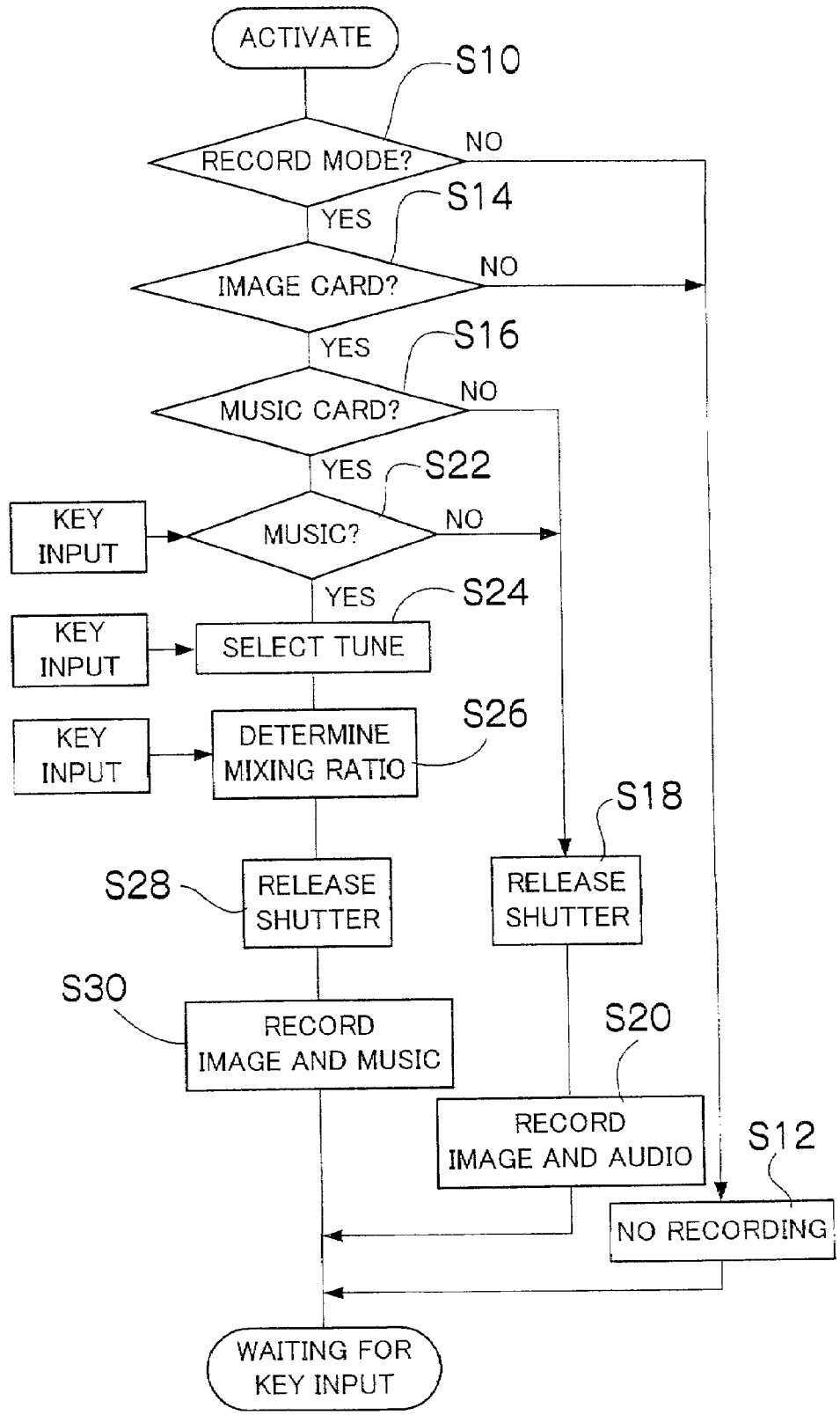
FIG. 2 is a flowchart showing an order of process when recording a moving image.

Hereunder a preferred embodiment will be described of a camera of the present invention in accordance with the accompanying drawings.

FIG. 1 is a block diagram showing a structure of a digital still camera to which the present invention is applied. The digital still camera which is constructed as shown in FIG. 1 can record and reproduce not only a still image but also a moving image. The digital still camera can obtain audio data from a microphone 22 at the same time, and can record the audio data in an image memory card 40 with the image data. Moreover, a mixture of audio data of background music or the like and the audio data obtained from the microphone 22 can be stored with the image data, or audio data of background music or the like can be stored with the image data instead of the audio data obtained from the microphone 22. Further, the camera serves as a reproducing apparatus that reproduces only audio such as music.

Keys are provided to the camera. A user operates the keys in order to give respective instructions such as mode setting (a record mode, a play mode, etc.) and releasing of a shutter, from a key inputting part 36 to a CPU 34 in FIG. 1. The CPU 34 controls circuits according to inputs from the key inputting part 36.

When the record mode for recording a moving image or a still image is set, an imaging device (CCD) 10 starts a recording processing, and converts, using respective light receiving sensors, a subject image formed on a light receiving surface into a signal charge corresponding with an amount of light which has entered. The signal charge of the respective light receiving sensors is successively outputted from the imaging device 10 as a voltage signal which corresponds with the amount of the signal charge.

The voltage signal outputted from the imaging device 10 is processed through a coefficient double sampling (CDS) and a color separation into the respective R, G, and B signals by the preamplifier 12, and adjustment of the signal levels of the respective color signals is executed (pre-white balance).

The respective color signals outputted from the preamplifier 12 are converted into R, G, and B digital signals by an A/D converter 14, and are inputted in an image signal processing part 16.

The R, G, and B digital signals inputted in the image signal processing part 16 are now converted into brightness signals and color difference signals and at the same time a predetermined process such as a gamma correction is executed; whereby, image data in a predetermined format is produced.

The image signal processing part 16 can record both a moving image and a still image. When a release switch is pressed in a record mode for a moving image, the image signal processing part 16 compresses the image data produced as described above in a format such as the motion JPEG while the release switch is being pressed, and records the compressed image data in the image memory card 40 in an order. If the release switch is pressed in a record mode for a still image, the image data of one frame at the time the release switch is pressed is compressed in the JPEG format, and the image data thus compressed is recorded in the image memory card 40. A predetermined file name is assigned to the image data of a sequence of the moving image, or the image data of the still image of one frame, and the image data are identifiable by the file names.

The image memory card 40 can be inserted in an image slot which is provided to the camera, and the memory card itself is not limited to recording images only. Well-known memory cards are a smart media, a PC card, and so forth, but the memory cards are not limited only to them. A form of a memory card does not have to be a card, and a storage medium of any form may be used (this is true for a music memory card 42 which will be described below as well). Formats for image data compressing are not limited only to the motion JPEG and the JPEG, and other formats (e.g. the MPEG) are allowed to use.

Separated from the above-described image data recording process, the image signal processing part 16 outputs the image data before being compressed to a D/A converter 18. The image data outputted from the image signal processing part 16 is converted into analog signals by the D/A converter 18, then is inputted in an encoder 20. After that, the converted image data is further converted into color composite video signals in the NTSC format, and is outputted as video signals from a video outputting terminal. When connecting external equipment such as a monitor and a personal computer to the video outputting terminal, video signals being taken by the camera are transferred to the external equipment.

Next, a description will be given of a reproducing process of the image data in a case where the camera is set at a play mode by an input from the key inputting part 36. When the user designates a file to be reproduced from the key inputting part 36, the CPU 34 instructs to the image signal processing part 16 to reproduce the image data of the file. The image signal processing part 16 reads out image data of the file from the image memory card 40, and recovers the image data before being expanded and compressed. Likewise, the image data is outputted as video signals via the D/A converter 18 and the encoder 20.

Now, a description will be given of a recording process for the audio data. In the record mode of the moving image, the recording process for the audio data is executed at the same time as the recording process for the above-mentioned image data. When the record mode for the moving image is set, the microphone 22 detects the audio and converts the audio into an electric signal. The audio signal is amplified by an amplifier 24 and is converted into a digital signal by the A/D converter 26, then is inputted in the audio signal processing part 28 as the audio data.

When pressing the release switch, the CPU 34 instructs the audio signal processing part 28 to execute an audio data recording process. By the instruction, the audio signal processing part 28 compresses the audio data obtained from the microphone 22 into a predetermined format such as the MP3. Then, the compressed audio data is recorded in the image memory card 40 by corresponding the audio data with the image data of the same time, while the image data of the moving image is recorded in the image memory card 40 in an order. In addition, the audio data is recorded in the same file as the corresponding image data in the motion JPEG format; however, the corresponding between the image data with the audio data may be done by any methods.

In the camera, the audio data obtained from the microphone 22 as described above is recorded in the image memory card 40 by an input from the key inputting part 36, and also the audio data of music recorded in a music memory card 42 beforehand which is different from the image memory card 40 is recorded in the image memory card 40 by mixing the music audio data with the audio data obtained from the microphone 22, or the music audio data is recorded instead of the audio data obtained from the microphone 22. In addition, two slots, an image slot and a music slot, are provided to the camera, and the music memory card 42 is inserted in the music slot. The audio data to be recorded in the memory card 42 beforehand is not limited to music and may be desired audio data, but in view of a standard use, the audio data is music audio data.

A ratio between the audio data obtained from the music memory card 42 and the audio data obtained from the microphone 22 when mixing these audio data, that is, a mixing ratio, can be set at any value by the user who inputs from the key inputting part 36. Moreover, only the audio data obtained from the music memory card 42 can be recorded in the image memory card 40 by completely excluding the audio data obtained from the microphone 22.

In a case where files (tunes) of a plurality of types are recorded in the music memory card 42, the user can freely select any file by designating a file name from the key inputting part 36.

The audio signal processing part 28 is provided setting contents such as the mixing ratio mentioned above from the CPU 34, and the audio signal processing part 28 executes processing in accordance with the setting contents. More specifically, the audio signal processing part 28 obtains the audio data from the microphone 22 in the same manner as described above, and at the same time reads out the audio data of the file designated from the music memory card 42. If the audio data recorded in the music memory card 42 is compressed in a format such as the MP3, the audio data is expanded for the time being. After that, the audio data obtained from the microphone and the audio data obtained from the music memory card 42 are mixed at a designated mixing ratio. The audio data thereby mixed is compressed, and then is recorded in the image memory card 40 by corresponding the audio data with the image data at the time the moving image data is recorded in the image memory card 40 in an order. In a case where only the audio data obtained from the music memory card 42 is recorded in the image memory card 40 instead of the audio data obtained from the microphone 22, the compressed audio data can be directly transferred from the music memory card 42 to the image memory card 40 if the compression format of the audio data is the same as the format for recording the audio data in the image memory card 40.

A description will now be given of a reproducing process for the audio data. The reproducing process for the audio data is executed at the same time as the reproducing process of the image data mentioned above in the play mode. When reproducing of a file of the moving image is designated in the play mode, the CPU 34 gives an instruction to the audio signal processing part 28 to reproduce the audio data. The audio processing part 28 reads out from the image memory card 40 the audio data which corresponds with the image data read out by the image signal processing part 16 from the image memory card 40, and expands the read out audio data, then recovers the audio data before being compressed. The recovered audio data is outputted to the D/A converter 30, converted into analog signals, and amplified by the amplifier 32, then is outputted as audio signals from the audio output terminal. When connecting the external equipment such as a monitor and a personal computer with the audio output terminal, the audio signal as well as the image signal outputted from the video output terminal can be transferred to the external equipment.

In the camera of the present invention, when the music play mode is set by an input from the key inputting part 36, only the audio data such as music recorded in the music memory card 42 can be reproduced regardless of reproducing of the image data. In short, the camera of the present invention can be used as a solid audio. When the user designates a file to be reproduced from the key inputting part 36 in the music play mode, the CPU instructs the audio signal processing part 28 to reproduce the audio data of the file. The audio signal processing part 28 reads out the audio data of the file designated from the music memory card 42, and outputs the audio data as audio signal via the D/A converter 30 and the amplifier 32 in the same manner as described above. In the camera, not only music reproducing, but also the audio data can be inputted from the external equipment, so that only the audio data can be recorded in the music memory card 42 regardless of recording of the image data.

A description directed to a process order for recording the moving image will be given with reference to the flowchart of FIG. 2. First, the CPU 34 determines whether or not an input from the key inputting part 36 sets a record mode for the moving image (Step S10). For example, if the determination is NO due to the play mode, "no recording" is determined (Step S12), and the CPU 34 waits the next input.

On the other hand, if the CPU 34 determines the record mode for the moving image at Step S10, the CPU 34 then determines whether or not the image memory card 40 is inserted in the image slot (Step S14). If the determination is NO, "no recording" is determined in the same manner as described above, and the CPU waits the next input. At Step S14, if the CPU 34 determines that the image memory card 40 is inserted in the image slot, the CPU 34 then determines whether or not the music memory card 42 is inserted in the music slot (Step S16). If the determination is NO, the CPU 34 determines that the audio data recorded in the image memory card 40 with the image data is the audio data only which is obtained from the microphone 22. In other words, when pressing the release switch (Step S18), the image data obtained from the imaging device 10 and the audio data obtained from the microphone 22 are recorded in the image memory card 40 (Step S20).

If the determination at Step S16 is YES, that is, if the music memory card 42 is inserted in the music slot, the CPU 34 then determines whether or not the input from the key inputting part 36 is set at background music present (Step S22). If the determination is NO, when pressing the release button (Step S18), the image data obtained from the imaging device 10 and the audio data obtained from the microphone 22 are recorded in the image memory card 40 (Step S20).

If the determination at Step S22 is YES, that is, if the input is set at the background music present, a tune is selected (file selection) in accordance with an input from the key inputting part 36 (Step S24). Continuously, the mixing ratio between the audio data from the microphone 22 and the audio data (music) from the music memory card 42 is determined in accordance with an input from the key inputting part 36 (Step S26). When the release switch is pressed after the completion of the above settings in the same manner (Step S28), the CPU 34 reads out the audio data of the selected tune which is selected from the music memory card 42 and at the same time obtains the audio data from the microphone 22, then produces mixed audio data in which the audio data is mixed at the mixing ratio. After that, the audio data is recorded in the image memory card 40 with the image data obtained from the imaging device 10 by corresponding the audio data with the image data.

In the present embodiment, a description has been given of a case where the audio data is recorded by corresponding the audio data with the image data for the moving image; however, the present invention can be applied in the same manner as described above for the moving image, if the audio data can be recorded by corresponding the audio data with the image data for the still image.

In the present embodiment, the image slot to which the image memory card 40 is attached and the music slot to which the music memory card 42 is attached are provided respectively for the exclusive use; however, the use of each slot is not limited only to image or music when providing such two slots. When the music memory card 42 is not used, both slots can be used as image slots, and when the image memory card 40 is not used, both slots can be used as music slots. For example, two slots may be used for editing such as duplication of a file.

In the present embodiment described above, a description has been given of a case where two slots are provided to which the image memory card 40 and the music memory card 42 are respectively attached; however, two slots are not always required, and the above-described processes may be performed with only one slot.

For example, the music memory card 42 is inserted in the slot before the recording so as to obtain necessary audio data from the music memory card 42, and the audio data is stored in an inner memory. After completion of the process, the music memory card 42 is taken out from the slot and the image memory card 40 is inserted in the slot. Therefore, the audio data such as music which is stored in the inner memory of the camera can be recorded in the image memory card 40 by mixing the audio data with the audio data obtained from the microphone 22, or can be recorded instead of the audio data.

In the present embodiment, the audio data such as music is recorded in the music memory card 42. However, the audio data such as music provided by a maker is stored in a non-volatile memory in the camera beforehand, and by using the audio data, the music memory card 42 and the music slot can be eliminated. Likewise, while the audio data such as music is stored in the non-volatile memory in the camera beforehand, the audio data stored in the non-volatile memory may be updated. A method for updating the audio data in that case can be achieved by attaching the memory card, in which the audio data for updating is recorded, to the slot, or by transferring the audio data from the external equipment by the input. Moreover, the audio data such as music is recorded beforehand in a format (folder name and an extension) which can be distinguished from the image data, and the audio data being mixed with the audio data obtained from the microphone 22 may be read out from the image memory card 40.

Further, in the present embodiment, the audio data obtained from the microphone 22 and the audio data obtained from the music memory card 42 can be mixed at a desired mixing ratio; however the present invention is not limited to that. One of the audio data obtained from the microphone 22 and the audio data obtained from the music memory card 42 may simply be selected to be recorded.

Furthermore, in the present embodiment, the present invention is applied to a digital still camera; however, the camera is not limited to the digital still camera. The present invention can be applied to a camera which has a function to record image and audio (such as a video camera) at the same time.

As described above, according to the camera of the present invention, the audio data of music or the like is obtained from the storage medium and stored with the image data. Therefore, the present invention is effective in a case where little audio is recorded (for example, a landscape is shot) or audio is not recorded, and thus the reproduction of the image can be enjoyable due to the audio from the storage medium. Moreover, since audio such as background music can be mixed with the audio from the microphone at the shooting, time-consuming audio editing after the shooting can be eliminated.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
   an image data storing device that stores image data captured by an imaging device in a first storage medium;
   an audio data obtaining device that obtains compressed audio data from one of the first storage medium and a second storage medium;
   an audio data storing device that records, in the first storage medium, the compressed audio data obtained by the audio data obtaining device when the image data storing device stores the image data in the first storage medium; and
   first and second storage slots,
   wherein both first and second storage slots are each capable of receiving the first storage medium,
   wherein the audio data storing device is capable of directing audio data obtained by the audio data obtaining device to the first or the second storage slots, whichever has the first storage medium received, and
   wherein the compressed audio data is directly transferred to the first storage medium without being decompressed prior to being transferred.

2. The camera as defined in claim 1, wherein the image data captured by the imaging device is moving image data.

3. The camera as defined in claim 1, further comprising two mounting parts to which the first storage medium and the second storage medium are attached.

4. The camera as defined in claim 1, wherein the second storage medium is built in the camera.

5. The camera as defined in claim 4, wherein the second storage medium is a rewritable storage medium.

6. The camera as defined in claim 1, further comprising an audio reproducing device that reproduces audio recorded in one of the first storage medium and the second storage medium.

7. A camera comprising:
   an image data storing device that stores image data captured by an imaging device in a first storage medium;
   an audio data obtaining device that obtains compressed audio data from one of the first storage medium and a second storage medium; and
   an audio data storing device that selectively records in the first storage medium one of the compressed audio data obtained by the audio data obtaining device and audio data captured by a microphone when the image data storing device stores the image data in the first storage medium; and
   first and second storage slots,
   wherein both first and second storage slots are each capable of receiving the first storage medium,
   wherein the audio data storing device is capable of directing audio data obtained by the audio data obtaining device to the first or the second storage slots, whichever has the first storage medium received, and
   wherein when the audio data obtained by the audio data obtaining device is selected, the audio data from the first or the second storage medium is directly transferred to the first storage medium without being decompressed prior to being transferred.

8. The camera as defined in claim 7, wherein the image data captured by the imaging device is moving image data.

9. The camera as defined in claim 7, further comprising two mounting parts to which the first storage medium and the second storage medium are attached.

10. The camera as defined in claim 7, wherein the second storage medium is built in the camera.

11. The camera as defined in claim 10, wherein the second storage medium is a rewritable storage medium.

12. The camera as defined in claim 7, further comprising an audio reproducing device that reproduces audio recorded in one of the first storage medium and the second storage medium.

13. A camera comprising:
    an image data storing device that stores image data captured by an imaging device in a first storage medium;
    an audio data obtaining device that obtains audio data from one of the first storage medium and a second storage medium, wherein the audio data obtaining device is capable of obtaining audio data from both the first and second storage mediums;
    an audio data storing device that mixes the audio data obtained by the audio data obtaining device and audio data captured by a microphone when the image data storing device stores the image data in the first storage medium, and records the mixed audio data in the first storage medium; and
    first and second storage slots,
    wherein both first and second storage slots are each capable of receiving the first storage medium,
    wherein the audio data storing device is capable of directing audio data obtained by the audio data obtaining device to the first or the second storage slots, whichever has the first storage medium received.

14. The camera as defined in claim 13, wherein the image data captured by the imaging device is moving image data.

15. The camera as defined in claim 13, further comprising two mounting parts to which the first storage medium and the second storage medium are attached.

16. The camera as defined in claim 13, wherein the second storage medium is built in the camera.

17. The camera as defined in claim 16, wherein the second storage medium is a rewritable storage medium.

18. The camera as defined in claim 13, further comprising an audio reproducing device that reproduces audio recorded in one of the first storage medium and the second storage medium.

19. The camera of claim 1, wherein the audio data obtaining device is capable of obtaining audio data from both the first and second storage mediums.

20. The camera of claim 7, wherein the audio data obtaining device is capable of obtaining audio data from both the first and second storage mediums.

21. The camera of claim 5, further including a storage slot, wherein the audio data for the second storage medium is provided by reading an external music storage medium loaded in the storage slot.

22. The camera of claim 11, further including a storage slot, wherein the audio data for the second storage medium is provided by reading an external music storage medium loaded in the storage slot.

23. The camera of claim 17, further including a storage slot, wherein the audio data for the second storage medium is provided by reading an external music storage medium loaded in the storage slot.

24. A method for mixing pre-recorded audio data with a captured image in a camera, wherein the camera has a single memory slot, the method comprising:
   reading the pre-recorded audio data from a first memory card inserted into the single memory slot;
   storing the pre-recorded audio data into an internal memory of the camera;
   waiting until an second memory card is inserted into the single memory slot;
   storing an image captured by the camera into the second memory card via the single memory slot; and
   transferring the pre-recorded audio data from the internal memory of the camera to the second memory card via the single memory slot.

25. The method of claim 24, wherein the internal memory of the camera is non-volatile.

26. The method of claim 24, further comprising:
   capturing audio data via a microphone of the camera; and
   transferring the captured audio data to the second memory card via the single memory slot.

27. The method of claim 24, further comprising:
   capturing audio data via a microphone of the camera; and
   mixing the captured audio data with the pre-recorded audio data from the internal memory; and
   transferring the mixed audio data to the second memory card via the single memory slot.

28. The method of claim 27, wherein the step of mixing the captured audio data and the pre-recorded audio data comprises:
   determining a mixing ratio of the captured audio data and the pre-recorded audio data; and
   mixing the captured data and the pre-recorded audio data based on the mixing ratio.

29. The method of claim 28, wherein the step of determining the mixing ratio comprises:
   prompting a user for a desired mixing ratio and receiving feedback from the user; or
   setting the mixing ratio from a predetermined mixing ratio.

* * * * *